(12) United States Patent
Sumi

(10) Patent No.: US 8,919,122 B2
(45) Date of Patent: Dec. 30, 2014

(54) COMPRESSOR HOUSING AND EXHAUST GAS TURBINE SUPERCHARGER

(75) Inventor: Norihiko Sumi, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/511,077

(22) PCT Filed: Aug. 10, 2011

(86) PCT No.: PCT/JP2011/068250
§ 371 (c)(1),
(2), (4) Date: May 21, 2012

(87) PCT Pub. No.: WO2013/021480
PCT Pub. Date: Feb. 14, 2013

(65) Prior Publication Data
US 2014/0150754 A1 Jun. 5, 2014

(51) Int. Cl.
F02B 33/44 (2006.01)
F02B 33/02 (2006.01)
F02B 37/16 (2006.01)
F04D 17/10 (2006.01)
F04D 29/42 (2006.01)
F02B 39/00 (2006.01)
F02M 25/06 (2006.01)

(52) U.S. Cl.
CPC ............. *F02B 33/02* (2013.01); *F02B 37/16* (2013.01); *F04D 17/10* (2013.01); *F04D 29/4206* (2013.01); *F02B 39/00* (2013.01); F05D 2220/40 (2013.01); F05D 2250/312 (2013.01); F05D 2250/314 (2013.01); F05D 2260/606 (2013.01); *F02M 25/06* (2013.01); Y02T 10/144 (2013.01)
USPC ............... 60/611; 60/602; 123/572; 123/573; 123/574

(58) Field of Classification Search
USPC ............................. 60/602, 611; 123/572–574
See application file for complete search history.

(56) References Cited

U.S. PATENT DOCUMENTS

| 7,204,241 B2 * | 4/2007 | Thompson et al. ........... 123/572 |
| 2007/0234720 A1 * | 10/2007 | Wilson et al. .................. 60/602 |
| 2011/0005222 A1 * | 1/2011 | Hayashi et al. ................ 60/602 |
| 2011/0283977 A1 * | 11/2011 | Iwata et al. ................... 123/564 |

FOREIGN PATENT DOCUMENTS

| JP | U-63-71428 | 5/1988 |
| JP | A-2006-29148 | 2/2006 |
| JP | A-2010-509530 | 3/2012 |
| JP | A-2010-174806 | 8/2012 |
| WO | WO 2008/055588 A1 | 5/2008 |

OTHER PUBLICATIONS

Nov. 15, 2011 International Search Report issued in International Patent Application No. PCT/JP2011/068250 (with translation).

* cited by examiner

*Primary Examiner* — Thomas Denion
*Assistant Examiner* — Thomas Olszewski
(74) *Attorney, Agent, or Firm* — Oliff PLC

(57) ABSTRACT

A compressor housing includes a housing body for enclosing an impeller, an inlet portion for introducing air toward the impeller, and a port portion arranged adjacent to the inlet portion. A valve body for opening and closing a bypass passage, which bypasses the impeller, can be rested against the port portion. A connection hole, to which a return passage for returning blow-by gas of an internal combustion engine is connected, is formed in a side wall of the inlet portion. The inlet portion and the port portion have a common wall. A communication hole, which configures a part of the return passage, is formed in the common wall. The communication hole is formed such that the projection plane defined by projecting the communication hole onto a surface of the side wall having the connection hole along the axis of the communication hole is contained in the connection hole.

6 Claims, 5 Drawing Sheets

COMPRESSOR HOUSING AND EXHAUST GAS TURBINE SUPERCHARGER

FIELD OF DISCLOSURE

The present invention relates to an exhaust gas turbine supercharger that performs supercharging by rotating a compressor impeller using energy produced by exhaust gas and to a compressor housing enclosing the compressor impeller.

BACKGROUND OF THE DISCLOSURE

Conventionally, an exhaust gas turbine supercharger and compressor housing described in, for example, Patent Document 1 are known as examples of the aforementioned types of exhaust gas turbine supercharger and compressor housing. The compressor housing (3) described in Patent Document 1 encloses an impeller (7) and includes an inlet portion (17), through which air is introduced toward the impeller (7). A bypass passage (27), which bypasses the impeller (7), is formed in the compressor housing (3). An air bypass mechanism (31) having a valve body for selectively opening and closing the bypass passage (27) is arranged in the bypass passage (27). A port portion, against which the valve body can rest, is arranged adjacent to the inlet portion (17).

In the exhaust gas turbine supercharger, the supply of air toward the impeller through the inlet portion is suspended when, for example, the accelerator is deactivated. This moves the valve body of the air bypass mechanism to an open position, thus returning some of the air from the downstream side to the upstream side with respect to the impeller. As a result, surging is avoided.

PRIOR ART DOCUMENT

Patent Document

Patent Document 1: Japanese Laid-Open Patent Publication No. 2010-174806

SUMMARY OF THE INVENTION

Problems that the Invention is to Solve

If casting is performed to manufacture a compressor housing having a bypass passage formed inside the compressor housing as in the aforementioned configuration, a core for forming the bypass passage must be employed, which complicates the casting procedure disadvantageously.

Alternatively, a guide hole may be drilled, in a side wall of an inlet portion of a compressor housing that has been provided through casting. The guide hole is then used to form a communication hole, which configures a part of a bypass passage, in the side wall of the inlet portion and a side wall of a port portion. However, in this case, the guide hole must be closed using a closing member in a separate step, which is also disadvantageous.

Accordingly, it is an objective of the present invention to provide a compressor housing and an exhaust gas turbine supercharger that facilitate manufacture of a compressor housing without forming a functionally unnecessary guide hole.

Means for Solving the Problems

Means for solving the above objectives and advantages thereof will now be discussed.

To achieve the foregoing objective, a compressor housing according to the present invention is used for enclosing an impeller. The compressor housing includes an inlet portion for introducing air toward the impeller and a port portion arranged adjacent to the inlet portion, and a valve body for selectively opening and closing a bypass passage that bypasses the impeller in which the valve body can be rested against the port portion. One of a side wall of the inlet portion and a side wall of the port portion has a connection hole to which a return passage for returning blow-by gas of an internal combustion engine is connected. A communication hole configuring a part of the return passage is formed in each of the side wall of the inlet portion and the side wall of the port portion. The communication hole is formed such that a projection plane defined by projecting the communication hole onto a wall surface having the connection hole along the axis of the communication hole is contained in the connection hole.

In this configuration, the connection hole may first be formed in the side wall of the inlet portion or the side wall of the port portion through cutting (for example, drilling), and then the connection hole is used to form the communication hole in the side wall of the inlet portion and the side wall of the port portion. Also, since the return passage is connected to the connection hole, it is unnecessary to close the connection hole using a closing member in a separate step. As a result, the compressor housing is manufactured easily without forming a functionally unnecessary guide hole.

In this case, the connection hole and the communication hole are preferably arranged coaxially with each other.

In this configuration, after the connection hole is formed through drilling, the communication hole is formed such that the axis of the communication hole coincides with the axis of the connection hole. This further facilitates machining of the compressor housing.

The inlet portion and the port portion preferably have a common side wall, and the communication hole is preferably formed in the common side wall.

In this configuration, the single communication hole is formed commonly for the inlet portion and the port portion. The compressor housing is thus machined further easily.

The connection hole is preferably formed in the side wall of the inlet portion.

In this configuration, most of the blow-by gas introduced through the connection hole is sent from the inlet portion toward the impeller. This prevents the high-temperature blow-by gas from flowing into the port portion. As a result, the valve body is reliably prevented from being thermally deteriorated by the high-temperature blow-by gas.

The inner diameter of the connection hole is preferably equal to the inner diameter of the communication hole.

In this configuration, following drilling of the connection hole, the communication hole is formed using the same drill blade. This further facilitates machining of the compressor housing.

An exhaust gas turbine supercharger preferably includes the above described compressor housing, and the supercharger preferably performs supercharging by rotating the impeller using energy produced by exhaust gas.

DETAILED DESCRIPTION OF THE PREFERRED EMBODIMENTS

A compressor housing and exhaust gas turbine supercharger according to one embodiment of the present invention will now be described with reference to FIGS. 1 and 2.

Figure 1:
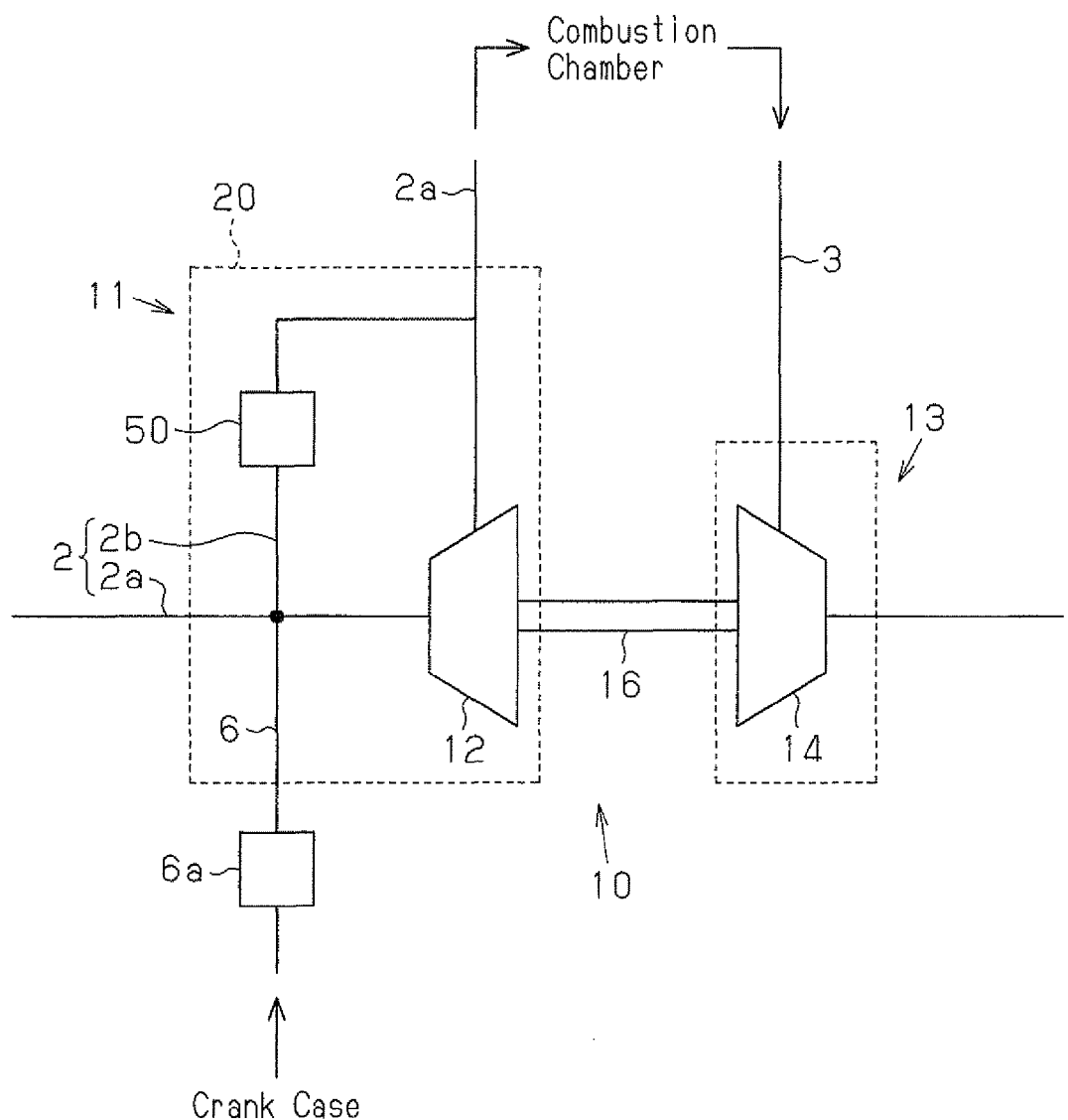
FIG. 1 is a diagram schematically representing the configuration of an internal combustion engine in the vicinity of an exhaust gas turbine supercharger according to one embodiment of the present invention.

FIG. 1 schematically shows the configuration of an internal combustion engine in the vicinity of an exhaust gas turbine supercharger 10 of the illustrated embodiment.

As show in FIG. 1, the exhaust gas turbine supercharger 10 includes a compressor 11 arranged in an intake passage 2 of the engine and a turbine 13 provided in an exhaust passage 4.

The compressor 11 is a centrifugal compressor and configured mainly by an impeller 12, which is provided in the intake passage 2, and a compressor housing 20 for enclosing the impeller 12. A turbine wheel 14, which is a component of the turbine 13, is connected to the impeller 12 through a shaft 16.

The intake passage 2 is configured by a main passage 2a, in which the impeller 12 is formed, and a bypass passage 2b for bypassing the impeller 12. The bypass passage 2b as a whole is arranged in the compressor housing 20. The starting end and the terminal end of the bypass passage 2b are connected to the main passage 2a at a position upstream of the impeller 12 and a position downstream of the impeller 12, respectively. An air bypass mechanism 50, which selectively opens and closes the bypass passage 2b, is formed in the bypass passage 2b. The air bypass mechanism 50 includes an actuator, which selectively opens and closes the bypass passage 2b in correspondence with the engine operating state.

A return passage 6, which returns blow-by gas from a crank case into the main passage 2a, is connected to the main passage 2a of the intake passage 2 at a position upstream of the impeller 12. A PCV valve 6a is arranged in the return passage 6.

The specific configuration of the compressor housing 20 will hereafter be described.

Figure 2:
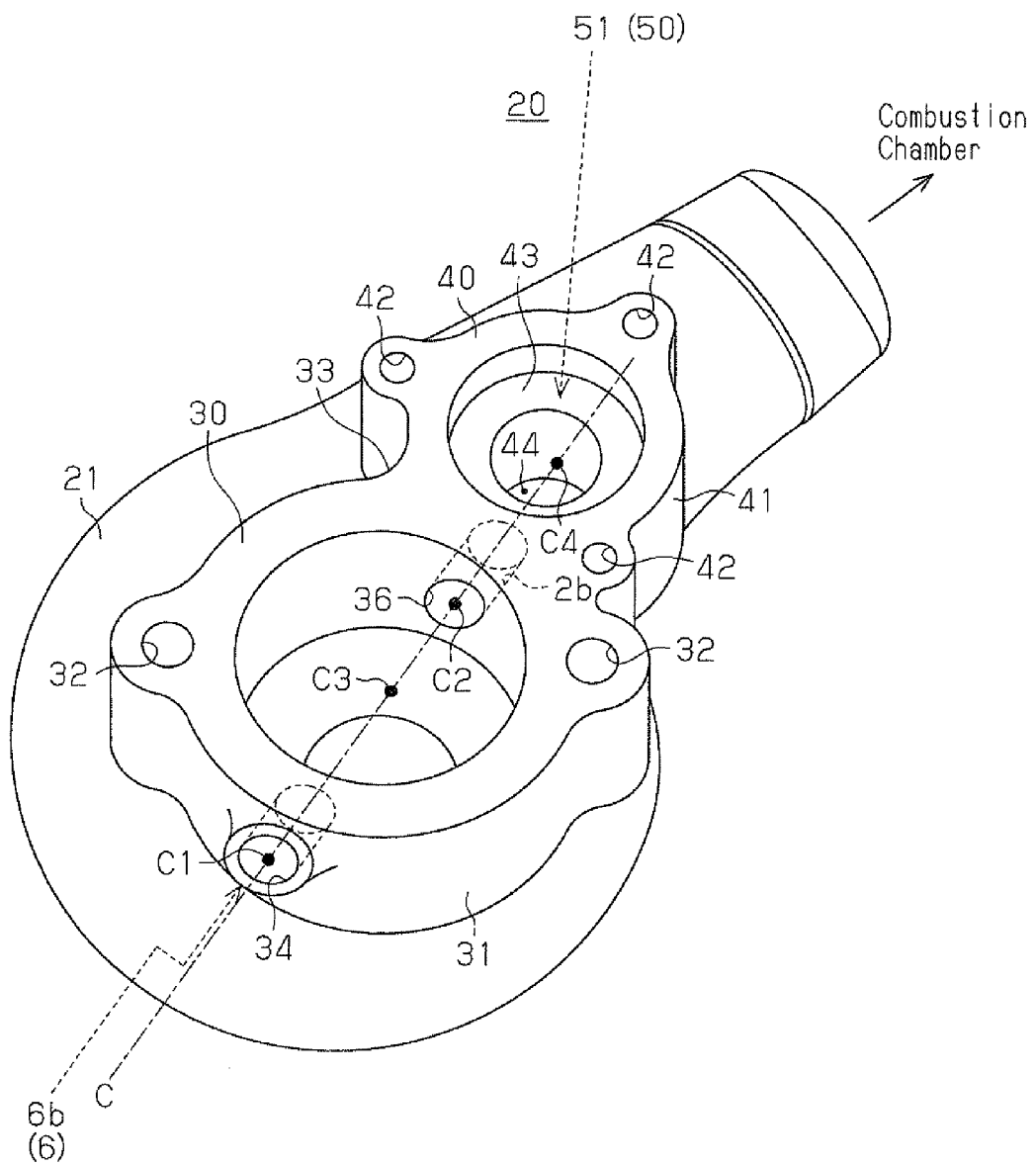
FIG. 2 is a perspective view showing the configuration of a compressor housing of the embodiment.

FIG. 2 is a perspective view showing the configuration of the compressor housing 20.

With reference to FIG. 2, the compressor housing 20 includes a housing body 21 for enclosing the impeller 12 (not illustrated in FIG. 2), a substantially cylindrical inlet portion 30 for sending air toward the impeller 12, and a substantially cylindrical port portion 40, which is arranged adjacent to the inlet portion 30. A valve body 51 of the air bypass mechanism 50 can rest against the port portion 40. As viewed in FIG. 2, the inlet portion 30 and the port portion 40 are located close to the viewer of the drawing with respect to the housing body 21. The housing body 21 encloses the impeller 12 at a position farther away from the viewer in FIG. 2. The space in the inlet portion 30 communicates with the space in the housing body 21. The space in the port portion 40 also communicates with the space in the housing body 21. In other words, in FIG. 2, the inlet portion 30 extends from a position spaced from the viewer of the drawing to a position close to the viewer. The radial center C3 of the inlet portion 30 is illustrated in FIG. 2. The port portion 40 is arranged adjacent to the inlet portion 30 and extends from a position spaced from the viewer of the drawing to a position close to the viewer. The radial center C4 of the port portion 40 is also illustrated in FIG. 2.

The distal end face of the inlet portion 30 and the distal end face of the port portion 40 are flush with each other. A plurality of bolt holes 32 are formed in the distal end face of the inlet portion 30 to bolt connection members (neither is shown) for connecting an inlet pipe, which is located upstream of the compressor housing 20, to the inlet portion 30. A plurality of bolt holes 42 are formed in the distal end face of the port portion 40 to bolt the air bypass mechanism 50 (the valve body 51) to the port portion 40. An opening 44, which communicates with a position downstream of the impeller 12, is formed in a bottom wall 43 of the port portion 40. The valve body 51 rests against the bottom wall 43. Specifically, a step formed between the inlet portion 30 and the opening 44 is configured as a valve seat against which the valve body 51 of the air bypass mechanism 50 rests.

The inlet portion 30 and the port portion 40 have a common wall 33, which is a side wall formed commonly for the inlet portion 30 and the port portion 40. A connection hole 34 through which the return passage 6 is connected to the inlet portion 30 extends through a side wall 31 of the inlet portion 30. The connection hole 34 is located at the position opposite to the common wall 33 with respect to the radial center C3 of the inlet portion 30. A connection member 6b for connecting the pipe configuring the return passage 6 to the inlet portion 30 is received in the connection hole 34.

A communication hole 36, which allows communication between the interior of the inlet portion 30 and the interior of the port portion 40 and is a part of the bypass passage 2b, extends through the common wall 33. In other words, the main passage 2a and the bypass passage 2b communicate with each other through the communication hole 36 at a position upstream of the impeller 12. As has been described, the bypass passage 2b is configured by the communication hole 36, the interior of the port portion 40, and the opening 44.

Figure 3:
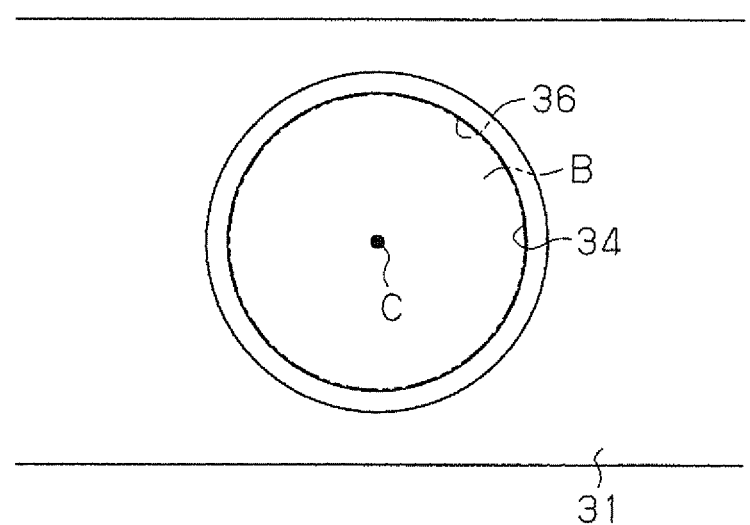
FIG. 3 is a view illustrating the relationship between a connection hole formed in a side wall of an inlet portion and a communication hole in the compressor housing of the embodiment, as viewed from the side corresponding to the connection hole.

As illustrated in FIG. 3, a projection plane B is defined by projecting the communication hole 36 onto the surface of the side wall 31, in which the connection hole 34 is formed. The communication hole 36 is formed such that the projection plane B is contained in the connection hole 34. Specifically, the inner diameter of the connection hole 34 is equal to the inner diameter of the communication hole 36. The center C1 of the connection hole 34 and the center C2 of the communication hole 36 are arranged on the axis C. In other words, the connection hole 34 and the communication hole 36 are formed on the same axis C. The radial center C3 of the inlet portion 30 and the radial center C4 of the port portion 40 are arranged on the axis C.

The connection hole 34 and the communication hole 36 are machined through drilling using a single drill blade after the compressor housing 20 is formed (without the connection hole 34 or the communication hole 36, accurately) through casting.

(Operation)

Operation of the illustrated embodiment will now be described.

In the exhaust gas turbine supercharger 10, the turbine wheel 14 is driven to rotate using energy produced by exhaust gas discharged from the combustion chamber. This rotates the impeller 12, which is connected to the turbine wheel 14 through a shaft. As a result, when air passes through the housing body 21 after having been introduced into the inlet portion 30 via the main passage 2a, the air is compressed by the impeller 12 and then supplied to the combustion chamber.

If supply of the air toward the impeller 12 is suspended due to, for example, deactivation of the accelerator, the valve body 51 of the air bypass mechanism 50 is switched to an open position. This returns some of the air from the downstream side to the upstream side with respect to the impeller 12 through the bypass passage 2b. As a result, surging is avoided.

As has been described, in the illustrated embodiment, the communication hole 36 is formed such that the projection plane B, which is defined by projecting the communication hole 36 onto the surface of the side wall 31 having the connection hole 34, is contained in the connection hole 34. As a result, the connection hole 34 may first be machined in the side wall 31 of the inlet portion 30 through drilling. Subsequently, using the connection hole 34, the communication hole 36 is formed in the common wall 33. Also, since the return passage 6 is connected to the connection hole 34, it is unnecessary to close the connection hole using a closing member in a separate step.

The compressor housing and the exhaust gas turbine supercharger according to the illustrated embodiment, which have been described, have the advantages described below.

(1) The side wall 31 of the inlet portion 30 has the connection hole 34 to which the return passage 6 for returning blow-by gas from the engine is connected. The inlet portion 30 and the port portion 40 have the common wall 33, which is a side wall provided commonly for the inlet portion 30 and the port portion 40. The common wall 33 has the communication hole 36, which is a part of the bypass passage 2b. The communication hole 36 is formed such that the projection plane B, which is defined by the communication hole 36 projected onto the surface of the side wall 31 having the connection hole 34 along the axis C of the communication hole 36, is contained in the connection hole 34. This configuration allows the compressor housing 20 to be manufactured easily without forming a functionally unnecessary guide hole.

(2) The connection hole 34 is formed in the side wall 31 of the inlet portion 30. As a result, most of the blow-by gas introduced through the connection hole 34 is sent from the inlet portion 30 toward the impeller 12. This prevents flow of the high-temperature blow-by gas into the port portion 40. The valve body 51 of the air bypass mechanism 50 is thus reliably prevented from being thermally deteriorated by the high-temperature blow-by gas.

(3) The connection hole 34 and the communication hole 36 are formed coaxially. The inner diameter of the connection hole 34 is equal to the inner diameter of the communication hole 36. As a result, after machining the connection hole 34 through drilling, the communication hole 36 is formed using the same drill blade. This facilitates machining of the compressor housing 20.

The compressor housing and the exhaust gas turbine supercharger according to the present invention are not restricted to the configuration of the illustrated embodiment but may be embodied in, for example, the forms described below, which are modified from the configuration of the embodiment.

Although the center C3 of the inlet portion 30 and the center C4 of the port portion 40 are arranged on the axis C in the illustrated embodiment, the present invention is not restricted to this. In other words, the centers C3, C4 do not necessarily have to be located on the axis C.

In the illustrated embodiment, the connection hole 34 and the communication hole 36 have equal inner diameters. However, the inner diameter of the connection hole and the inner diameter of the communication hole may differ from each other as needed.

Figure 4:
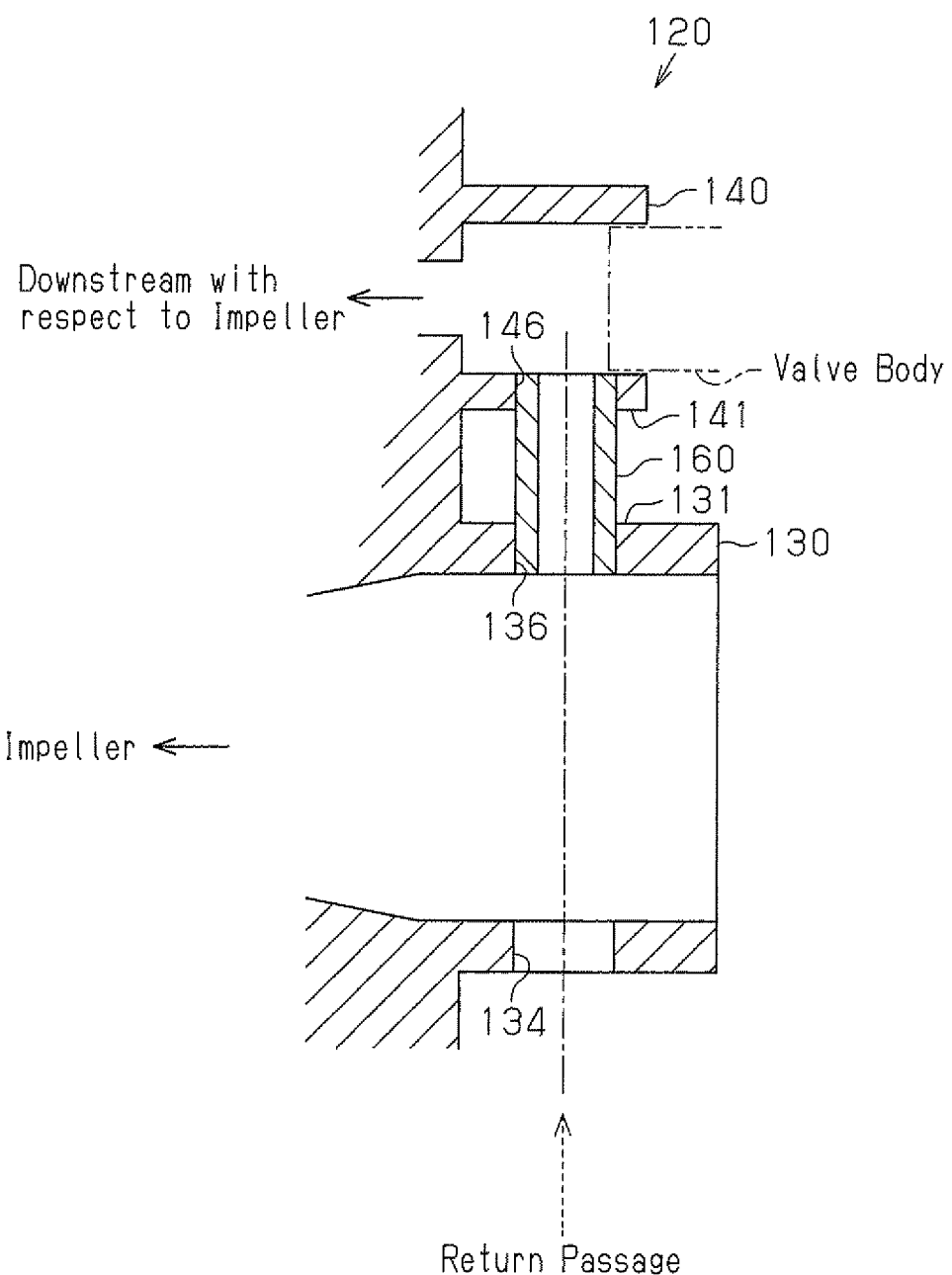
FIG. 4 is a cross-sectional view showing a part of a modification of the compressor housing according to the invention.
Figure 5:
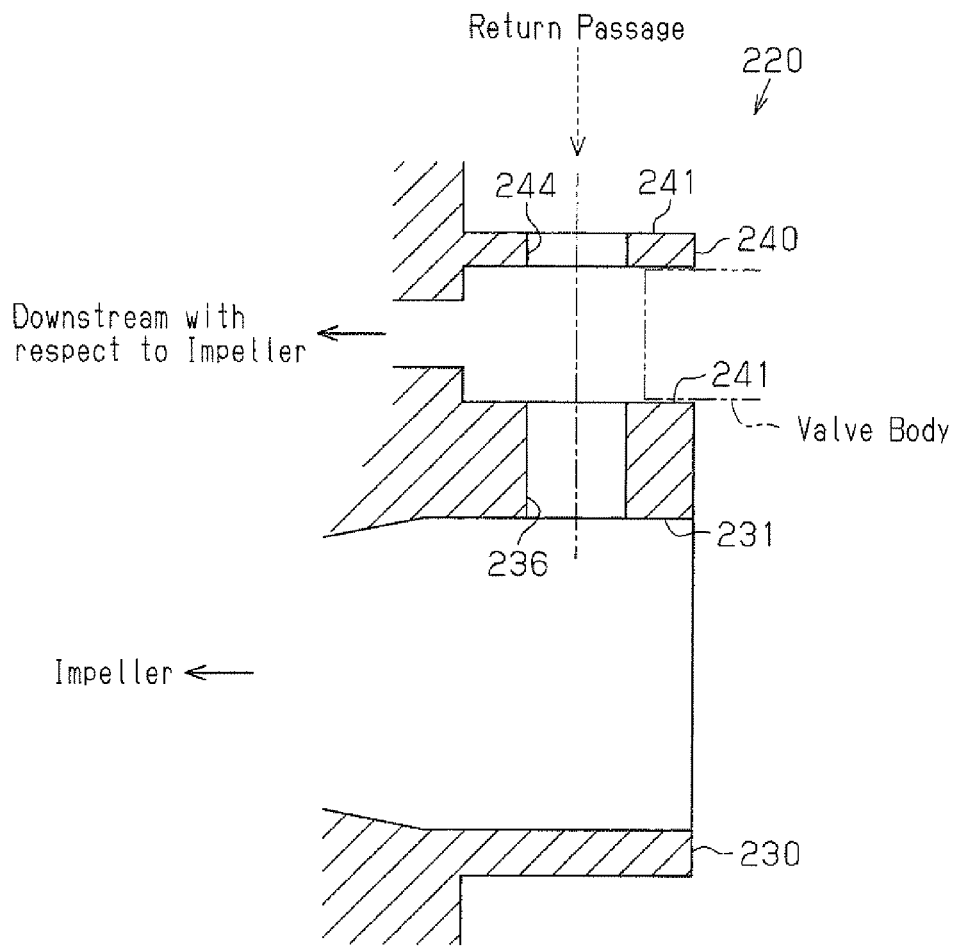
FIG. 5 is a cross-sectional view showing a part of another modification of the compressor housing according to the invention.

In the illustrated embodiment, the inlet portion 30 and the port portion 40 are adjacent to each other and have a common side wall (the common wall 33). Instead of this configuration, as illustrated in FIG. 4, for example, a compressor housing 120 may include an inlet portion 130 and a port portion 140, which are spaced from each other and joined together through an independent connection pipe 160. In this case, a communication hole 136 and a communication hole 146 are formed in a side wall 131 of the inlet portion 130 and a side wall 141 of the port portion 140, respectively. The communication holes 136, 146 are both connected to the connection pipe 160. The side wall 131 of the inlet portion 130 has a connection hole 134, which is arranged about the axis of the connection pipe 160.

To prevent high-temperature blow-by gas from flowing into the port portion 40 and thermally deteriorating the valve body 51 of the air bypass mechanism 50, it is preferable to form the connection hole 34 in the side wall 31 of the inlet portion 30 as in the illustrated embodiment. However, as long as there is no problem regarding thermal deterioration of a valve body, a compressor housing 220 having a connection hole 244 formed in a side wall 241 of a port portion 240 may be employed. Also in this case, it is necessary to coaxially arrange the connection hole 244 and a communication hole 236, which is formed in both the side wall 231 of the inlet portion 230 and the side wall 241 of the port portion 240 to allow communication between the inlet portion 230 and the port portion 240.

Figure 6:
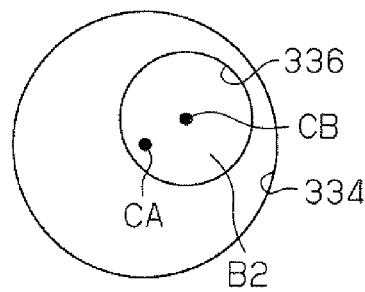
FIG. 6 is a view illustrating the relationship between a connection hole formed in a side wall of an inlet portion and a communication hole in another modification of the compressor housing according to the invention, as viewed from the side corresponding to the connection hole.

In the illustrated embodiment and the modifications, the connection hole 34 and the communication hole 36 are arranged coaxially (see, for example, FIGS. 2 and 3). However, the present invention is not restricted to this. That is, as illustrated in FIG. 6, for example, a connection hole 334 and a communication hole 336 do not necessarily have to be coaxial with each other. In other words, the axis CA of the connection hole 334 and the axis CB of the communication hole 336 do not necessarily have to coincide with each other.

Specifically, the communication hole 336 may be formed in any suitable manner as long as a projection plane B2, which is defined by projecting the communication hole 336 onto the surface of a side wall 331 having the connection hole 334, is contained in the connection hole 334.

DESCRIPTION OF THE REFERENCE NUMERALS

2 . . . intake passage, 2a . . . main passage, 2b . . . return passage, 4 . . . exhaust passage, 6 . . . return passage, 6a . . . PCV valve, 6b . . . connection member, 10 . . . exhaust gas turbine supercharger, 11 . . . compressor, 12 . . . impeller, 13 . . . turbine, 14 . . . turbine wheel, 16 . . . shaft, 20, 120, 220 . . . compressor housing, 21 . . . housing body, 30, 130, 230 . . . inlet portion, 31, 131, 231, 331 . . . side wall, 32 . . . bolt hole, 33 . . . common wall, 34, 134, 334 . . . connection hole, 36, 136, 236, 336 . . . communication hole, 40, 140, 240 . . . port portion, 41, 141, 241 . . . side wall, 42 . . . bolt hole, 50 . . . air bypass mechanism, 51 . . . valve body, 160 . . . connection pipe, 146 . . . communication hole, 244 . . . connection hole

The invention claimed is:

1. A compressor housing for enclosing an impeller, the compressor housing comprising an inlet portion for introducing air toward the impeller and a port portion arranged adjacent to the inlet portion, a valve body for selectively opening and closing a bypass passage that bypasses the impeller in which the valve body can be rested against the port portion, wherein one of a side wall of the inlet portion and a side wall of the port portion has a connection hole to which a return passage for returning blow-by gas of an internal combustion engine is connected, a communication hole configuring a part of the return passage is formed in each of the side wall of the inlet portion and the side wall of the port portion, and the communication hole is formed such that a projection plane defined by projecting the communication hole onto a wall surface having the connection hole along the axis of the communication hole is contained in the connection hole.

2. The compressor housing according to claim 1, wherein the connection hole and the communication hole are arranged coaxially with each other.

3. The compressor housing according to claim 1, wherein the inlet portion and the port portion have a common side wall, and the communication hole is formed in the common side wall.

4. The compressor housing according to claim 1, wherein the connection hole is formed in the side wall of the inlet portion.

5. The compressor housing according to claim 1, wherein the inner diameter of the connection hole is equal to the inner diameter of the communication hole.

6. An exhaust gas turbine supercharger comprising the compressor housing according to claim 1, wherein the supercharger performs supercharging by rotating the impeller using energy produced by exhaust gas.

* * * * *